United States Patent
Ha et al.

(10) Patent No.: US 9,738,277 B2
(45) Date of Patent: Aug. 22, 2017

(54) METHOD AND APPARATUS FOR REMOTE PARKING

(71) Applicant: HYUNDAI MOTOR COMPANY, Seoul (KR)

(72) Inventors: Kyung Soo Ha, Pohang-si (KR); Jin Ho Park, Hwaseong-si (KR); Joo Woong Yang, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/935,984

(22) Filed: Nov. 9, 2015

(65) Prior Publication Data

US 2017/0043766 A1 Feb. 16, 2017

(30) Foreign Application Priority Data

Aug. 12, 2015 (KR) .......................... 10-2015-0114025

(51) Int. Cl.
| | |
|---|---|
| *G05D 1/00* | (2006.01) |
| *G05D 3/00* | (2006.01) |
| *B60W 30/06* | (2006.01) |
| *B60W 10/20* | (2006.01) |
| *B60W 10/18* | (2012.01) |
| *B60W 10/04* | (2006.01) |
| *B60W 10/10* | (2012.01) |

(52) U.S. Cl.
CPC ............ *B60W 30/06* (2013.01); *B60W 10/04* (2013.01); *B60W 10/10* (2013.01); *B60W 10/18* (2013.01); *B60W 10/20* (2013.01); *G05D 1/0088* (2013.01); *B60W 2540/04* (2013.01); *B60W 2550/308* (2013.01); *B60W 2550/402* (2013.01); *B60W 2710/18* (2013.01); *B60W 2710/20* (2013.01); *B60W 2720/10* (2013.01); *B60W 2900/00* (2013.01)

(58) Field of Classification Search
USPC ..................................................... 701/23, 41
See application file for complete search history.

(56) References Cited

U.S. PATENT DOCUMENTS

| | | | |
|---|---|---|---|
| 8,384,561 | B2 | 2/2013 | Kadowaki et al. |
| 8,912,923 | B2 | 12/2014 | Barth et al. |
| 2010/0097199 | A1* | 4/2010 | Schwartz .................. B60R 1/00 340/435 |

(Continued)

FOREIGN PATENT DOCUMENTS

| | | |
|---|---|---|
| JP | 2007-290558 A | 11/2007 |
| JP | 4078949 B2 | 4/2008 |

(Continued)

*Primary Examiner* — Tyler Paige
(74) *Attorney, Agent, or Firm* — Brinks Gilson & Lione

(57) ABSTRACT

An apparatus for a remote parking includes: an user input unit to receive a user input for instructing a parking of a vehicle remotely; a distance detection unit to detect a separation distance to a side vehicle located around the vehicle; a parking operation unit to accomplish an automatic parking of the vehicle; and a controller to control the parking operation unit so that a separation distance to a passenger seat side vehicle located in the side of passenger seat of the vehicle is adjusted to a preset reference distance based on the detected separation distance, when receiving the user input through the user input unit.

11 Claims, 5 Drawing Sheets

(56) References Cited

U.S. PATENT DOCUMENTS

| | | | |
|---|---|---|---|
| 2011/0140921 A1* | 6/2011 | Pampus | B62D 15/027 340/932.2 |
| 2012/0197492 A1* | 8/2012 | Schneider | B62D 15/0285 701/41 |
| 2012/0316732 A1* | 12/2012 | Auer | B62D 15/0265 701/41 |
| 2013/0314503 A1* | 11/2013 | Nix | G06K 9/00805 348/46 |
| 2014/0081476 A1* | 3/2014 | Verdugo-Lara | G08G 1/168 701/1 |
| 2014/0303839 A1* | 10/2014 | Filev | G06F 3/0481 701/36 |
| 2014/0350804 A1* | 11/2014 | Park | B62D 15/0285 701/51 |
| 2015/0138011 A1* | 5/2015 | Hiramaki | G01S 13/931 342/118 |
| 2015/0166062 A1* | 6/2015 | Johnson | B60W 30/12 701/41 |
| 2015/0175205 A1* | 6/2015 | Park | B62D 15/0285 701/41 |
| 2015/0375742 A1* | 12/2015 | Gebert | B62D 15/027 701/23 |
| 2016/0185389 A1* | 6/2016 | Ishijima | B62D 15/0285 701/41 |

FOREIGN PATENT DOCUMENTS

| | | |
|---|---|---|
| JP | 2008-296639 A | 12/2008 |
| JP | 2010-95027 | 4/2010 |
| JP | 2011-524298 | 9/2011 |
| JP | 4985164 B2 | 7/2012 |
| JP | 5692292 B | 12/2013 |
| JP | 2014-227021 A | 12/2014 |
| KR | 10-20110114893 A | 10/2011 |
| KR | 10-1305630 B1 | 9/2013 |
| KR | 10-2014-0079984 | 6/2014 |
| KR | 10-2015-0061422 | 6/2014 |
| WO | 2010/043944 A1 | 4/2010 |

* cited by examiner

METHOD AND APPARATUS FOR REMOTE PARKING

CROSS-REFERENCE TO RELATED APPLICATION

This application claims the benefit of the Korean Patent Application No. 10-2015-0114025, filed on Aug. 12, 2015, which is incorporated herein by reference in its entirety.

FIELD

The present disclosure relates to a method and an apparatus for a remote parking.

BACKGROUND

The statements in this section merely provide background information related to the present disclosure and may not constitute prior art.

A remote control system of a vehicle is a system that controls a vehicle as a remotely located driver operates a portable terminal such as a smart key or a smart phone in the state in which the driver does not ride the vehicle.

In a conventional remote control system, a remote parking support system of a vehicle operates according to the procedures of transmitting a unique authentication code built into a fob or a hard key of the smart key to the vehicle, and authenticating the transmitted authentication code by the vehicle.

FIG. 1 is a diagram illustrating a separation distance adjustment in the case of an automatic parking.

When automatically parking a vehicle is performed using a remote control, as shown in the left diagram of FIG. 1, a basic control is set so that the separation distances (a, b) between the vehicle of a user who desires to park and vehicles on both sides of user's vehicle may be identical.

Meanwhile, even in the case of the basic control, the distance (a) to the driver seat side vehicle located in the side of driver seat of the user vehicle may be smaller than the distance (b) to the passenger seat side vehicle located in the side of passenger seat of the user vehicle as shown in the middle diagram of FIG. 1, whereas the distance (a) to the driver seat side vehicle located in the side of driver seat of the user vehicle may be larger than the distance (b) to the passenger seat side vehicle located in the side of passenger seat of the user vehicle as shown in the right diagram of FIG. 1.

That is, additional margin (i.e., + margin or − margin) may exist based on the separation distance. In this case, the user vehicle may be probably parked close to any one vehicle.

In FIG. 1, when the user vehicle is parked close to the right side between both side vehicles, that is, when the distance (a) to the driver seat side vehicle located in the side of driver seat of the user vehicle is larger than the distance (b) to the passenger seat side vehicle located in the side of passenger seat of the user vehicle, it is inconvenient for the driver of the right side vehicle to get on and off.

In addition, as shown in the middle diagram of FIG. 1, when the user vehicle is located to be close the left side vehicle, that is, when the distance (b) to the passenger seat side vehicle located in the side of passenger seat of the user vehicle is larger than the distance (a) to the driver seat side vehicle located in the side of driver seat of the user vehicle, it is inconvenient for the driver of user vehicle to get on and off.

SUMMARY

The present disclosure has been made in view of the above problems, and provides a convenience at the time of getting on and off other vehicle by controlling separation distances to the vehicles parked in both sides of a user vehicle when accomplishing a remote parking.

The present disclosure further provides a method and an apparatus for a remote parking capable of re-adjusting a separation distance, when it is determined that the driver of other vehicle is not able to easily get on and off the vehicle, based on the recognized parking environment.

Accordingly, the present disclosure further provides a method and an apparatus for a remote parking capable of reducing an inconvenience felt by the driver of other vehicle due to the lack of space when getting on and off the vehicle, and improving the marketability of a parking system.

In accordance with an aspect of the present disclosure, an apparatus for a remote parking includes: an user input unit configured to receive a user input for instructing a parking of a vehicle remotely; a distance detection unit configured to detect a separation distance to a side vehicle located around the vehicle; a parking operation unit configured to accomplish an automatic parking of the vehicle; and a controller configured to control the parking operation unit so that a separation distance to a passenger seat side vehicle located in the side of passenger seat of the vehicle is adjusted to a preset reference distance based on the detected separation distance, when receiving the user input through the user input unit.

The controller receives a care mode selection signal which enables to operate a care mode for a driver of the passenger seat side vehicle from the user input unit, when the separation distance between the vehicle and the passenger seat side vehicle is smaller than the reference distance.

The controller determines whether a separation distance between the vehicle and a driver seat side vehicle is equal to or larger than the reference distance after adjusting the separation distance between the vehicle and the passenger seat side vehicle to the reference distance, when the separation distance between the vehicle and the passenger seat side vehicle is smaller than the reference distance.

The controller controls the parking operation unit so that the separation distance between the vehicle and the passenger seat side vehicle becomes the reference distance, when the separation distance between the vehicle and the driver seat side vehicle is equal to or larger than the reference distance, as a result of the determination.

The controller controls the parking operation unit so that the separation distance between the vehicle and the driver seat side vehicle becomes a minimum separation distance, when the separation distance between the vehicle and the driver seat side vehicle is smaller than the reference distance, as a result of the determination.

The minimum separation distance is set to a distance from a parking line between the vehicle and the driver seat side vehicle to the vehicle.

When the separation distance between the user vehicle and the passenger seat side vehicle is smaller than the reference distance, the controller determines whether the separation distance between the vehicle and the driver seat side vehicle is equal to or larger than a preset threshold distance, and the threshold distance is set to a value obtained by adding a preset minimum separation distance to a distance moved to adjust the separation distance between the vehicle and the passenger seat side vehicle to the reference distance.

The parking operation unit includes an operation and transmission unit, a braking unit, and a motor driven power steering.

In accordance with another aspect of the present disclosure, a method for a remote parking includes: receiving a user input for instructing a parking of a vehicle remotely; detecting a separation distance to a side vehicle located around the vehicle; accomplishing an automatic parking of the vehicle in such a manner that a separation distance to a passenger seat side vehicle located in the side of passenger seat of the vehicle is adjusted to a preset reference distance based on the detected separation distance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
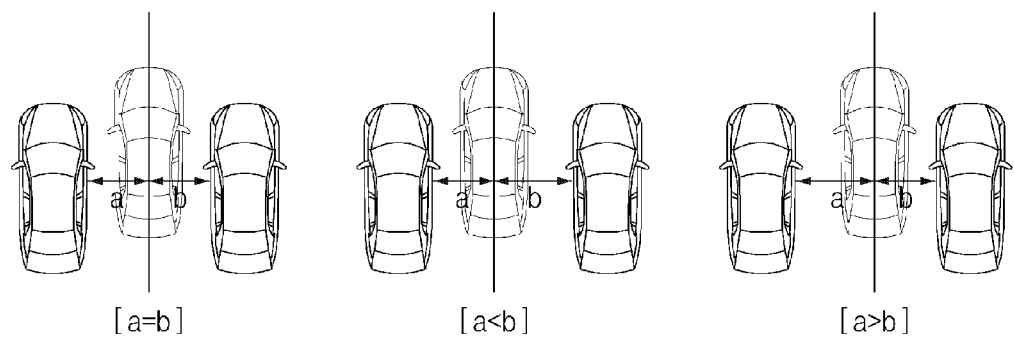
FIG. 1 is a diagram illustrating a separation distance adjustment in the case of an automatic parking.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Detailed descriptions of well-known functions and structures incorporated herein may be omitted to avoid obscuring the subject matter of the present disclosure.

Prior to a detailed description of the present disclosure, terms and words used in the specification and the claims shall not be interpreted as commonly-used dictionary meanings, but shall be interpreted as to be relevant to the technical scope of the present disclosure based on the fact that the inventor may property define the concept of the terms to explain the present disclosure in best ways. Therefore, the forms and the configurations depicted in the drawings are illustrative purposes only and do not represent all technical scopes of the forms, so it should be understood that various equivalents and modifications may exist at the time of filing this application. Some constituent elements shown in the drawings may be exaggerated, omitted or schematically drawn for the purpose of convenience or clarity.

Figure 2:
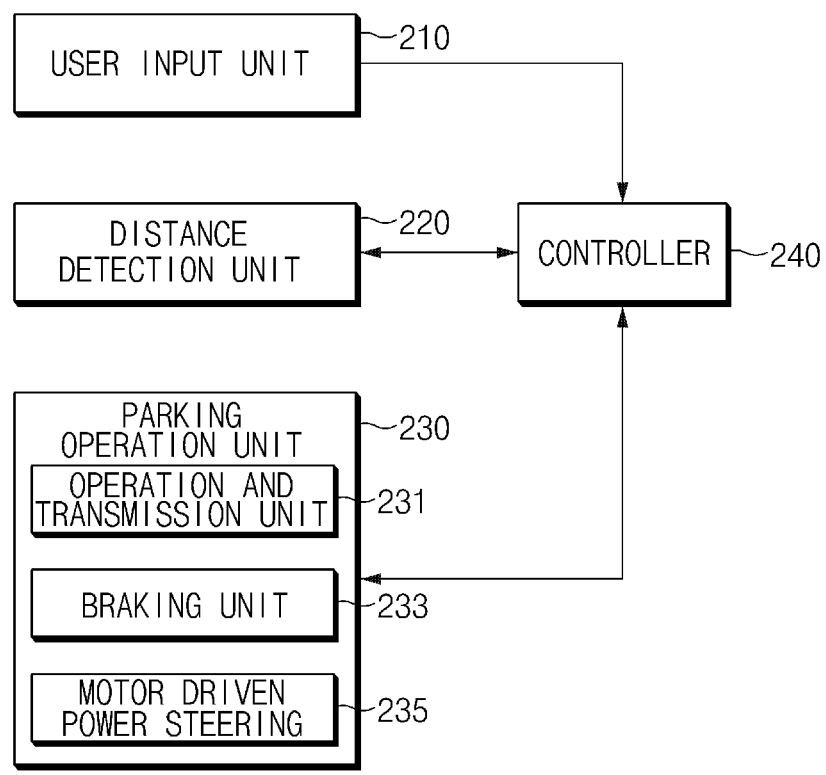
FIG. 2 is a block diagram illustrating a remote parking apparatus according to one form of the present disclosure.

FIG. 2 is a block diagram illustrating a remote parking apparatus according to one form of the present disclosure.

As shown, the remote parking apparatus may include a user input unit 210, a distance detection unit 220, a parking operation unit 230, and a controller 240 for controlling these elements. The remote parking apparatus may be implemented as some configurations included in a vehicle, may be implemented as an independent module included in the vehicle, or may be implemented as an independent module that can be detached from the vehicle and can set or examine the situation that requires an automatic remote parking of the vehicle.

The user input unit 210 may receive a user input for instructing the parking of the vehicle remotely, and send the received user input to the controller 240. The user input unit 210 may be implemented as a remote control device such as a smart key that can control the vehicle remotely. Further, according to another form, the user input unit 210 may be implemented as a user interface such as a button or a touch panel which is attached to the vehicle and which is able to receive an automatic parking signal of a user, instead of a remote control.

The distance detection unit 220 may be located in the rear, the side, or the rear side of the vehicle and detect a separation distance between user's vehicle and the vehicle around the user's vehicle, and may be implemented as an ultrasonic sensor, an infrared sensor, and the like.

The parking operation unit 230 may include an operation and transmission unit 231, a braking unit 233, and a motor driven power steering (MDPS) 235. The parking operation unit 230 may include a well known configuration as a configuration for accomplishing mechanical operations involved in the parking of the vehicle and the automatic parking of the vehicle, and may serve an actual parking of the vehicle under the control of the controller 240. The parking operation unit 230 may further include a backup light controller, a lamp, a rear sensor, and the like which are not shown.

When receiving the user input through the user input unit 210, the controller 240 may control the parking operation unit 230 so that a separation distance to the passenger seat side vehicle located in the side of passenger seat of the user vehicle may be adjusted to a preset reference distance, based on the detected separation distance.

The controller 240 may calculate separation distance information related to the separation distance between both vehicles by using distance information received from the distance detection unit 220 such as a rear side sensor.

According to one form of the present disclosure, the controller 240 may receive a distance value of both vehicles from the distance detection unit 220, and may calculate an average value of the received distance value. Based on the average value, the separation distance between the user vehicle and the passenger seat side vehicle may be adjusted. However, only when the received distance value is within a certain range from the average value, it may be included in the calculation, and the average distance value which is calculated up to the point of time of arriving at the determined position of parking completion may be set to the separation distance.

The controller 240 which calculated the separation distance or the average value may determine whether there is enough space for the driver of the other vehicle to get on and off through the separation distance. The controller 240 may determine that the space for parking is insufficient when the separation distance value of the passenger seat side (the right side based on LHD, the left side based on RHD) is a certain distance value (e.g., a reference distance) or less. The separation distance value of the driver seat side (the left side based on LHD, the right side based on RHD) may be referred for a space secure control.

When the space is not enough for the driver of other vehicle to get on and off, the controller 240 may output a control command to secure a separation distance to the parking operation unit 230, and the operation for parking, such as the control of a steering angle by the control command and the like, is performed.

Meanwhile, according to one form of the present disclosure, when the separation distance between the user vehicle and the passenger seat side vehicle is smaller than the reference distance, the controller 240 may receive a care mode selection signal which enables to operate a care mode for the driver of the passenger seat side vehicle from the user input unit 210.

That is, the user may select a normal mode of controlling the separation distances between the user vehicle and both side vehicles to be identical, and a care mode of controlling the separation distance of passenger seat side to be a reference distance value for determining enough space. In the case of the care mode, when the separation distance of driver seat side is not enough, it is controlled that the separation distance of driver seat side is remained in the minimum margin value.

Figure 3:
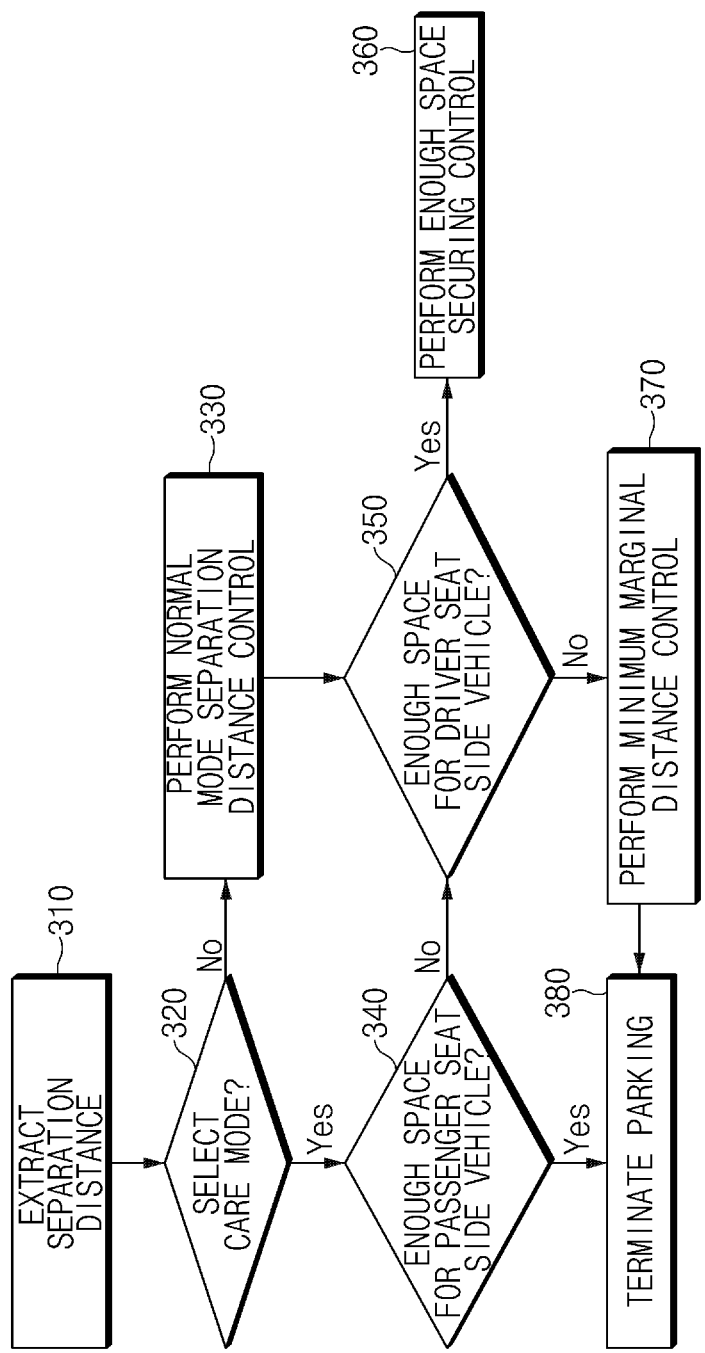
FIG. 3 is a flowchart illustrating a remote parking method according to one form of the present disclosure.

FIG. 3 is a flowchart illustrating a remote parking method according to one form of the present disclosure.

First, when the automatic remote parking is selected, the distance detection unit may detect a distance between the user vehicle to be parked and the side vehicles located in both sides of the user vehicle, and the controller 240 may extract a separation distance by calculating an average value based on the detected distance (310).

The user may select any one of the care mode and the normal mode through the user input unit. When a user selects the normal mode not the care mode (320), a normal mode separation distance control is performed (330).

The normal mode means that the separation distances to both side vehicles are controlled to be identical as shown in FIG. 1.

On the other hand, when the care mode is selected by the user (320), the controller may determine whether there is enough space for the passenger seat side vehicle (340).

Based on the determination, when the separation distance between the user vehicle and the passenger seat side vehicle is smaller than the reference distance, the controller may adjust the separation distance between the user vehicle and the passenger seat side vehicle to the reference distance. Thereafter, the controller may determine whether the separation distance between the user vehicle and the driver seat side vehicle is equal to or larger than the reference distance, that is, determine whether there is enough space for the driver seat side (350).

Figure 4:
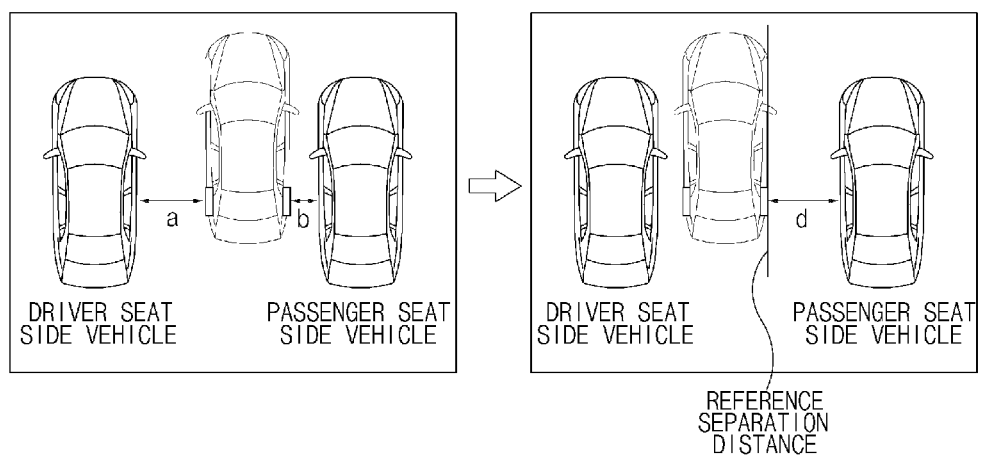
FIG. 4 is a diagram illustrating a separation distance adjustment in an automatic remote parking according to one form of the present disclosure.
Figure 5:
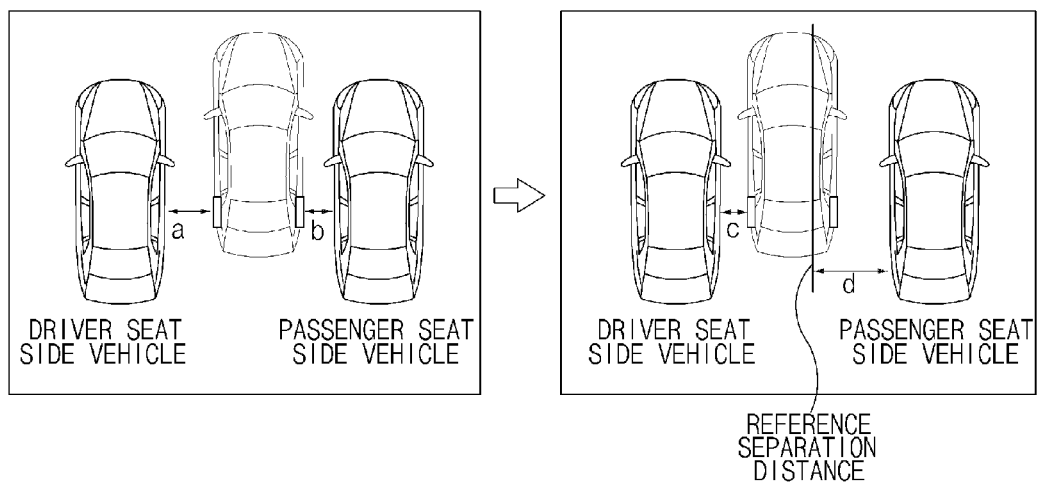
FIG. 5 is a diagram illustrating a separation distance adjustment at the time of an automatic remote parking according to another form of the present disclosure.

Based on the determination, when there is enough space for the driver seat side, as shown in FIG. 4, the controller may control the parking operation unit to perform an enough space securing control (360). When there is not enough space for the driver seat side, as shown in FIG. 5, the controller may control the parking operation unit to perform a minimum marginal distance control to reduce the distance of the driver seat side (370).

When there is enough space between the user vehicle and the passenger seat side vehicle, the parking is terminated (380).

FIG. 4 is a diagram illustrating a separation distance adjustment in an automatic remote parking according to one form of the present disclosure.

According to the form as illustrated in FIG. 3, when firstly entering a parking space, if the extracted passenger seat side distance (b) is smaller than a certain reference distance (d), it is determined that the space is not sufficient, and then, when the driver seat side distance (a) is sufficient to satisfy the reference distance (d) after the parking space is secured with respect to the passenger seat side distance (b) (350), the control of securing a space is performed. On the other hand, if the driver seat side distance (a) is not sufficient, the minimum separation distance control (FIG. 5) is performed.

That is, the condition in which the control of securing a space is accomplished as in the present form is achieved in the case in which the separation distance between the user vehicle and the passenger seat side vehicle is smaller than the reference distance (b<d), and the separation distance between the user vehicle and the driver seat side vehicle located in the side of driver seat of the user vehicle is equal to or larger than the reference distance after the separation distance between the user vehicle and the passenger seat side vehicle is adjusted to the reference distance.

At this time, the reference distance may be expressed as the sum of a preset minimum separation distance and |d−b|.

That is, when a >=minimum separation distance+|d−b|, the control of securing a space is performed, and the controller 240 may control the parking operation unit 230 so that the separation distance between the user vehicle and the passenger seat side vehicle may become the reference distance. At this time, the amount of distance control corresponds to d−b.

FIG. 5 is a diagram illustrating a separation distance adjustment at the time of an automatic remote parking according to another form of the present disclosure.

As described above, according to the present form as illustrated in FIG. 3, when firstly entering a parking space, if the extracted passenger seat side distance (b) is smaller than a certain reference distance (d), it is determined that the space is not sufficient, and then, when the driver seat side distance (a) is not sufficient to satisfy the reference distance (d) after the parking space is secured with respect to the passenger seat side distance (b) (350), the minimum separation distance control may be performed.

That is, the condition in which the minimum separation distance control is accomplished as in the present form is achieved in the case in which the separation distance between the user vehicle and the passenger seat side vehicle is smaller than the reference distance (b<d), and the separation distance between the user vehicle and the driver seat side vehicle located in the side of driver seat of the user vehicle is smaller than the reference distance after the separation distance between the user vehicle and the passenger seat side vehicle is adjusted to the reference distance.

At this time, the reference distance may be expressed as the sum of a preset minimum separation distance and |d−b|.

That is, when a <minimum separation distance+|d−b|, the minimum separation distance control may be performed, and the controller 240 may control the parking operation unit 230 so that the separation distance between the user vehicle and the passenger seat side vehicle may become a minimum separation distance.

In this case, the minimum separation distance may be set to a distance from a parking line between the user vehicle and the driver seat side vehicle to the user vehicle or may be set to an arbitrary value, and the amount of distance control of vehicle movement corresponds to a−c.

According to another form of the present disclosure, when the separation distance between the user vehicle and the passenger seat side vehicle is smaller than the reference distance, the controller may determine whether the separation distance between the user vehicle and the driver seat side vehicle is equal to or larger than a preset threshold distance. In addition, the threshold distance may be set to a value obtained by adding a preset minimum separation distance to the distance moved to adjust the separation distance between the user vehicle and the passenger seat side vehicle to the reference distance.

As described above, the present disclosure provides a convenience at the time of getting on and off other vehicle by controlling separation distances to the vehicles parked in both sides of a user vehicle when accomplishing a remote parking.

In addition, the present disclosure provides the method and the apparatus for a remote parking capable of re-adjusting a separation distance, when it is determined that the driver of other vehicle is not able to easily get on and off the vehicle, based on the recognized parking environment.

Accordingly, the present disclosure is able to reduce an inconvenience felt by the driver of other vehicle due to the lack of space when getting on and off the vehicle, and improve a parking system.

Although forms of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. An apparatus for a remote parking, the apparatus comprising:
 a user input unit configured to receive a user input for remotely instructing a parking of a first vehicle;
 a distance detection unit configured to detect a first separation distance relative to a second vehicle located on a passenger seat side and a second separation distance relative to a third vehicle located on a driver seat side of the first vehicle;
 a parking operation unit configured to perform an automatic parking of the first vehicle; and
 a controller configured to control the parking operation unit so that the first separation distance between the first vehicle and the second vehicle is adjusted to a first preset reference distance based on the detected separation distance, the first separation distance being different from the second separation distance, when receiving the user input through the user input unit.

2. The apparatus of claim 1, wherein the controller is configured to receive a care mode selection signal which enables the care mode for a driver of the second vehicle from the user input unit when the first separation distance between the first vehicle and the second vehicle is smaller than the first preset reference distance.

3. The apparatus of claim 1, wherein the controller is configured to control the parking operation unit such that the first separation distance between the first vehicle and the second vehicle becomes a second preset reference distance, when the second separation distance between the first vehicle and the third vehicle is equal to or larger than the first preset reference distance.

4. The apparatus of claim 1, wherein the controller is configured to control the parking operation unit such that the first separation distance between the first vehicle and the second vehicle becomes a minimum separation distance, when the second separation distance between the first vehicle and the third vehicle is smaller than the first preset reference distance.

5. The apparatus of claim 4, wherein the minimum separation distance is set to a distance from a parking line between the first vehicle and the third vehicle to the first vehicle.

6. The apparatus of claim 1, wherein, when the first separation distance between the first vehicle and the second vehicle is less than the first preset reference distance, the controller is configured to determine whether the second separation distance between the first vehicle and the third vehicle is equal to or greater than a preset threshold distance, and is configured to set the preset threshold distance to a value obtained by adding a preset minimum separation distance to a distance moved to adjust the first separation distance between the first vehicle and the second vehicle to the first preset reference distance.

7. The apparatus of claim 1, wherein the parking operation unit comprises an operation and transmission unit, a braking unit, and a motor driven power steering.

8. A method for a remote parking using a remote parking apparatus having an input unit, a detection unit, a parking unit and a controller, the method comprising:
 receiving, by the input unit, a user input for remotely instructing a parking of a first vehicle;
 detecting, by the detection unit, a first separation distance relative to a second vehicle on a passenger seat side and a second separation distance relative to a third vehicle located on a driver seat side of the first vehicle;
 accomplishing, by the parking unit, an automatic parking of the first vehicle such that the first separation distance between the first vehicle and the second vehicle is adjusted to a first preset reference distance based on the detected separation distance, the first separation distance being different from the second separation distance.

9. The method of claim 8, wherein in the step of accomplishing an automatic parking of the first vehicle, the first separation distance between the first vehicle and the second vehicle becomes the first preset reference distance, when the second separation distance between the first vehicle and the third vehicle is equal to or greater than the first reference distance.

10. The method of claim 8, wherein in the step of accomplishing an automatic parking of the first vehicle, the first separation distance between the first vehicle and the second vehicle becomes a minimum separation distance, when the second separation distance between the first vehicle and the third vehicle is less than the first preset reference distance.

11. An apparatus for a remote parking, the apparatus comprising:
 a user input unit configured to receive a user input for remotely instructing a parking of a first vehicle;
 a distance detection unit configured to detect a first separation distance relative to a second vehicle located on a passenger seat side and a second separation distance relative to a third vehicle located on a driver seat side vehicle of the first vehicle;
 a parking operation unit configured to perform an automatic parking of the first vehicle; and
 a controller configured to control the parking operation unit so that the first separation distance between the first vehicle and the second vehicle is adjusted to a first preset reference distance based on the detected separation distance, the first separation distance being different from the second separation distance, when receiving the user input through the user input unit.

* * * * *